Sept. 10, 1935.   B. F. NOLTE, JR   2,013,924
SAFETY IMPACT SWITCH
Filed July 17, 1933
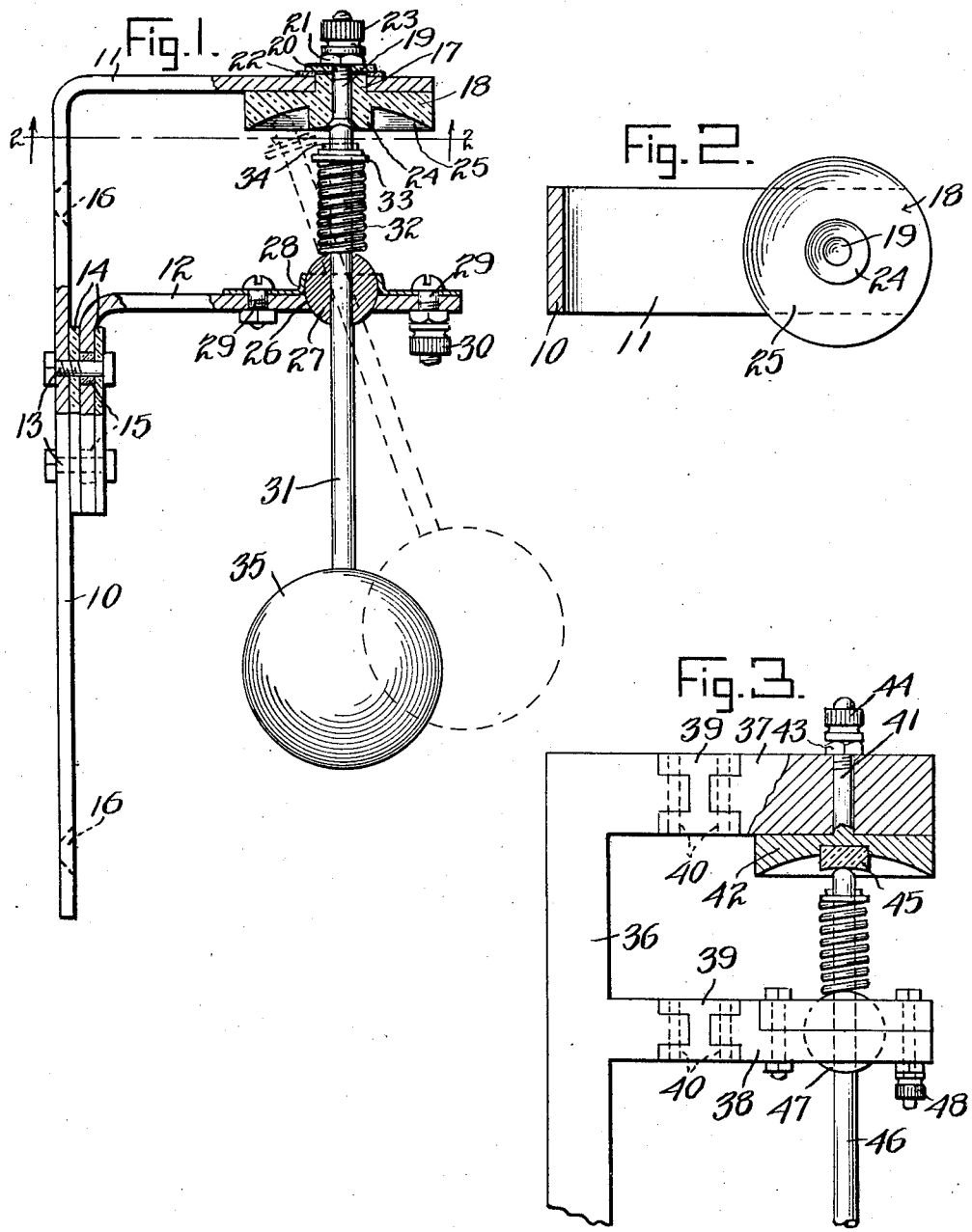
Inventor
Benjamin F. Nolte, Jr.
By
Attorney Patented Sept. 10, 1935

2,013,924

UNITED STATES PATENT OFFICE 2,013,924

SAFETY IMPACT SWITCH

Benjamin F. Nolte, Jr., Ashland, Ky.

Application July 17, 1933, Serial No. 680,842

2 Claims. (Cl. 200—52)

This invention relates to automatic safety switches or circuit breakers of the impact type adapted to be applied to and connected in the electrical circuits of a vehicle or the like.

An object of the invention is to provide a switch which may be operated by impact resulting from any cause, regardless of the direction of the impact, to break the circuit, thus preventing danger to life and property resulting from fire which might occur and to further provide a switch which may be operated in a similar manner to complete a circuit to make contact or trip a mechanism in order to cause brakes or the like to be applied to prevent accidents.

Another object of the invention is to provide a device which is simple in construction yet positive in operation for the various purposes and uses to which it may be applied.

Referring to the accompanying drawing, which is made a part hereof and on which similar reference characters indicate similar parts, Figure 1 is a side view in elevation partly in section of the device, Figure 2, a section on line 2—2 of Figure 1, and Figure 3, a side view in elevation partly in section of a modified form of the device.

In the drawing reference character 10 indicates the support of the device having an upper arm 11 and a similar arm 12 which is connected below the upper arm 11 and extending in the same direction. The arm 11 is connected to the support 10 by means of the bolts 13 and insulated therefrom by means of suitable insulation 14 and 15. The upper arm 11 is provided with an opening 17 in which an insulating cap 18 is positioned and held by a contacting pin 19 extending therethrough. The pin is secured in place by means of the washer 20 and nut 21 on the upper surface of the arm 11. An insulating washer 22 is placed between the washer 20 and the arm 11. A thumb nut 23 is also provided on the end of the pin 19 by means of which the device may be easily connected in an electrical circuit. The under face of the insulating cap 18 is provided with a central depending portion 24 and a concave recess or ring 25 formed around the portion 24. The lower arm 12 is provided with an opening 26 in which a ball member 27 seats and is held in place by any suitable means such as a clamp band 28 which is secured in place by means of the bolts and nuts 29. One of the bolts 29 is provided with a thumb nut 30 for connecting the other side of the switch in an electrical circuit. A rod 31 extends through the ball member 27 and is held in contact with the pin 19 by means of a spring 32 seated on top of the ball around the rod 31 with the upper end resting against the washers 33 held in place by a pin 34 extending through the rod 31. The lower end of the rod 31 is provided with any suitable weight 35 attached thereto in any suitable manner, being positioned below the arm 12.

In Figure 3 reference numeral 36 indicates a support member provided with the arms 37 and 38 extending therefrom and being insulated from the support member by suitable insulators 39. The insulators 39 and the arms of the support are secured together by means of the bolts 40. The upper arm 37 is provided with a contacting pin 41 having a cap portion 42 secured thereto and mounted on the under side of the arm, being held in fixed position by means of a nut 43. The contacting pin is provided on the upper end with a thumb nut 44. The underside of the portion 42 is concaved and is provided at its center with an insulating block 45 connected thereto by any suitable means. A rod 46 is provided, being similar to the rod shown in Figure 1 and mounted in the ball member 47 which is positioned in the arm 38 and secured by suitable bolts or fastening means. One of the bolts is provided with a thumb nut 48. A weight (not shown) is attached to the lower end of the rod 46.

The operation of the device as shown in Figures 1 and 3 is as follows: The device is attached in place by any suitable means such as screws, extending through the support 10 which is provided with suitable openings 16 for that purpose. In the position shown in these figures the rod in Figure 1 is in contact with the pin 19 making a circuit from the top arm through the rod to the lower arm. The spring 32 normally holds the rod 31 in contact with the pin 19. In the case where the object on which the device is mounted, for example, is an automobile, strikes an obstruction the impact tends to throw the weight 35 attached to the bottom of the rod in the direction of the impact, as indicated in the dotted line position, which throws the upper end of the rod in the concave recess 25 of the insulating cap 18, thus breaking the circuit. The depending portion 24 prevents the return of the rod 31 into contact with the stationary contact 19.

In the case of the device shown in Figure 3 the rod is normally held in contact with the insulating block 45 and upon striking an obstruction the upper end of the rod is thrown off the block and is forced by the spring to contact with the concaved portion 42 of the contact member 41 thereby completing the circuit which may set up mechanism to operate brakes or the like. The circuit is maintained closed since the rod 46 must be manually reset in its normal position.

It may be seen from the above described mechanisms, whether the device be applied to an automobile, airplane or any other electric circuit, the device operates to sever the electrical circuits regardless of the direction from which the impact comes and prevents the usual hazards from fire as a result of wrecks, collisions, etc. By reversing certain parts of the device it may be made to operate in a similar manner to complete circuits which in turn may be adapted to apply brakes, etc. to prevent various accidents which would ordinarily occur if such a device was not employed. The devices described above are simple in construction, easily connected in circuits, positive in action and it is obvious that such devices have utility which is clearly evident.

Having thus fully described my said invention, what I claim as new and desire to secure by Letters Patent is:—

1. A device of the kind described comprising a support having spaced arms extending therefrom, a member secured to the upper arm having a depending projecting portion and a concave portion surrounding said projecting portion, one of said portions being of conducting material and forming a contact member and the other of said portions being made of insulating material, a rod pivoted on the lower arm and normally contacting the end surface of said projecting portion, resilient means holding said rod and said projecting portion in engagement, and a weight secured to the lower end of said rod adapted to be moved by impact to cause said rod to disengage the projecting portion of the upper arm and engage the concave portion surrounding the same.

2. An impact switch comprising a pivoted contact member, resilient means tending to move said contact member longitudinally with respect to the pivotal support thereof, a cooperating stationary contact member, an insulating member surrounding said stationary contact member adjacent the contact face thereof and inertia-controlled means for disengaging said contact members, said insulating member being formed as a detent member arranged to hold said pivoted contact member in spaced relation to the cooperating contact member after said disengagement.

BENJAMIN F. NOLTE, Jr.